(12) United States Patent
De Souza et al.

(10) Patent No.: US 10,758,920 B2
(45) Date of Patent: Sep. 1, 2020

(54) CENTRIFUGAL SEPARATOR DEVICE FOR PRIMARY PROCESSING OF PRESSURIZED OIL

(71) Applicants: PETRÓLEO BRASILEIRO S.A.-PETROBRAS, Rio de Janeiro, RJ (BR); DELP ENGENHARIA MECANICA S/A, Bairro Cinco-Contagem-MG (BR)

(72) Inventors: Marcos Aurélio De Souza, Itajubá-MG (BR); Leonardo Dos Santos Pereira, Rio de Janiero-RJ (BR); Thiago Esteves Martins, Belo Horizonte-MG (BR)

(73) Assignees: PETROLEO BRASILEIRO S.A.-PETROBRAS, Rio de Janeiro (BR); DELP Engenharia Mecânica S/A, Bairro Cinco-Contagem-MG (BR)

( * ) Notice: Subject to any disclaimer, the term of this patent is extended or adjusted under 35 U.S.C. 154(b) by 423 days.

(21) Appl. No.: 15/346,960

(22) Filed: Nov. 9, 2016

(65) Prior Publication Data

US 2017/0128956 A1    May 11, 2017

(30) Foreign Application Priority Data

Nov. 9, 2015    (BR) ...................... 10-2015-028129-3

(51) Int. Cl.
*B04B 11/06*    (2006.01)
*B04B 1/08*    (2006.01)
(Continued)

(52) U.S. Cl.
CPC .......... *B04B 11/06* (2013.01); *B01D 17/0217* (2013.01); *B01D 19/0052* (2013.01);
(Continued)

(58) Field of Classification Search
CPC .......... B04B 11/06; B04B 11/02; B04B 1/08; B01D 19/0052; B01D 21/262; B01D 17/0217
(Continued)

(56) References Cited

U.S. PATENT DOCUMENTS

| 5,487,720 A | * | 1/1996 | Pace ........................ B04B 1/08 494/35 |
| 5,779,619 A | * | 7/1998 | Borgstrom ............ B04B 11/082 494/56 |
| 2015/0175439 A1 | * | 6/2015 | Quiter ...................... B04B 1/08 210/784 |

FOREIGN PATENT DOCUMENTS

| CA | 2 619 883 C | 4/2014 |
| WO | 96/22835 A1 | 8/1996 |

(Continued)

*Primary Examiner* — Walter D. Griffin
*Assistant Examiner* — Shuyi S. Liu
(74) *Attorney, Agent, or Firm* — Sughrue Mion, PLLC

(57) ABSTRACT

This invention is for a centrifugal separator comprised of a group formed by: a central feed chamber (10) fed by a feed pipe (20); a separation chamber (30) including a number of frustoconical disks (3); a first recovery chamber (11) in communication with a first liquid phase recovery pipe (21) and a gaseous phase recovery pipe (23); and a second recovery chamber (12) communicating with a second liquid phase recovery pipe (22), where the group is encompassed by a rotating envelope (1), where the central feed chamber (10) is in liquid fluid communication with the separation chamber (30), and in gaseous fluid communication with the first recovery chamber (11), where the separation chamber (30) is in fluid communication with the first and second recovery chambers where the centrifugal separator is encompassed by pressurizable stationary casing (4a, 4b).

14 Claims, 1 Drawing Sheet

(51) Int. Cl.
*B04B 11/02* (2006.01)
*B01D 17/02* (2006.01)
*B01D 21/26* (2006.01)
*B01D 19/00* (2006.01)

(52) U.S. Cl.
CPC .............. *B01D 21/262* (2013.01); *B04B 1/08* (2013.01); *B04B 11/02* (2013.01)

(58) Field of Classification Search
USPC ......... 494/60, 63, 67, 68, 69, 70, 72, 74, 75
See application file for complete search history.

(56) References Cited

FOREIGN PATENT DOCUMENTS

| WO | 00/53330 A1 | 9/2000 | |
|----|----|----|----|
| WO | 03/061838 A1 | 7/2003 | |
| WO | WO-2014016125 A1 * | 1/2014 | ............... B04B 1/08 |

* cited by examiner

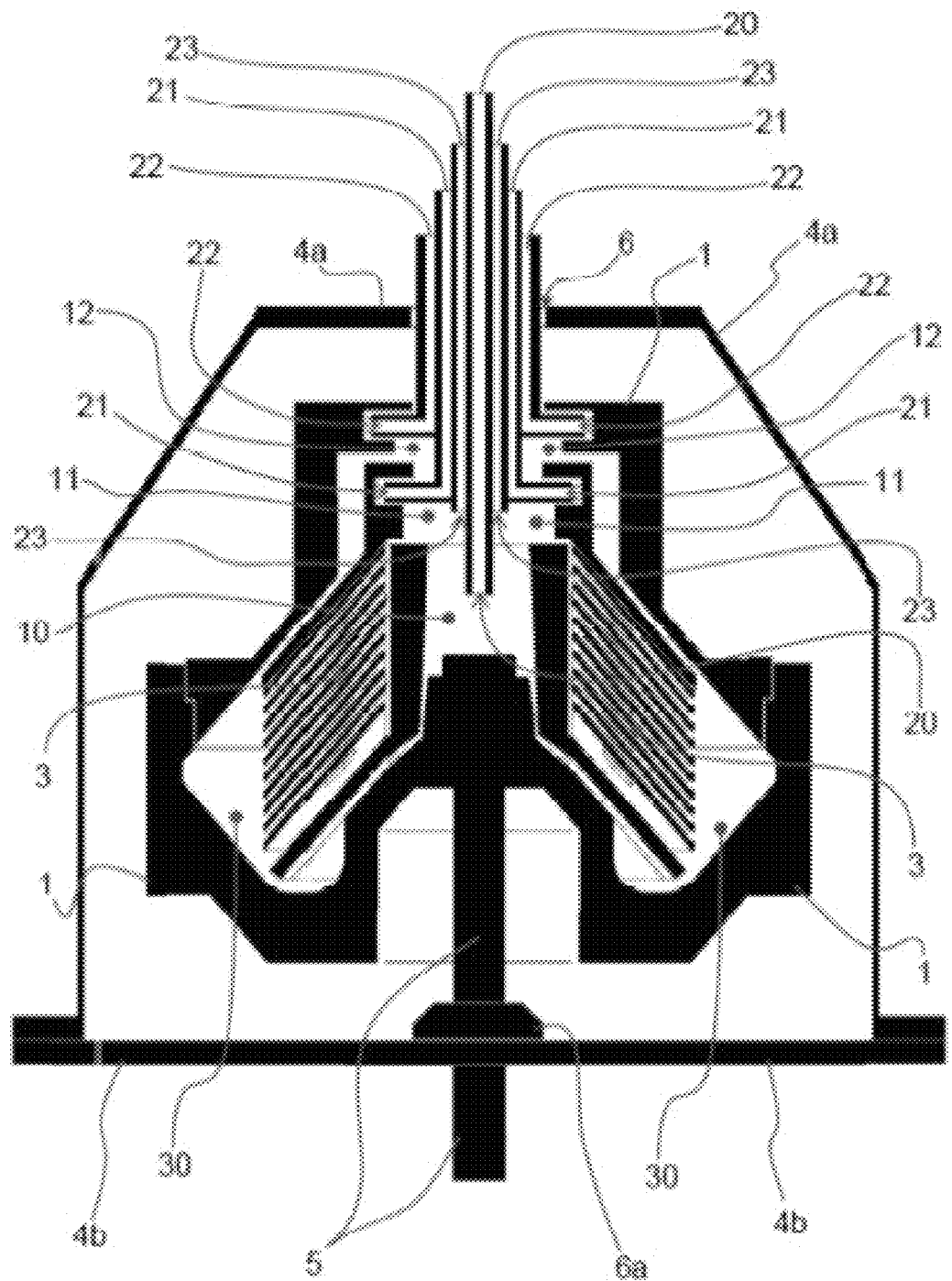

CENTRIFUGAL SEPARATOR DEVICE FOR PRIMARY PROCESSING OF PRESSURIZED OIL

CROSS REFERENCE TO RELATED APPLICATIONS

This application claims priority based on Brazilian Patent Application No. 10-2015-028129-3, filed Nov. 9, 2015, the contents of which are incorporated herein by reference in their entirety.

INVENTION FIELD

This invention involves a centrifugal separator device for primary processing of pressurized oil.

BASIS OF THE INVENTION

Primary processing of oil is comprised of separation operations to obtain individual components of the liquid from the well, separated and at the required level of purity.

In this process, water, oil, gas and particulate solids, components that are initially mixed in the abovementioned liquid, are separated. As known in the prior art, in order for separation to be more efficient, it is desirable that throughout the process the liquid be pressurized during the separation process. Thus, it is known that the volume of gas formed in the mixture would be significantly reduced, since the liquid is pressurized, facilitating its collection, storage and subsequent processing at a plant.

Some of the best known devices used in the prior art separation process are centrifugal separators, which involve a number of rotating frustoconical disks arranged parallel to each other, and the disks are arranged inside an envelope. The liquid to be separated is then placed in the device so that the rotation of the disks causes the light liquid phase to be shifted to an area closer to its rotation axis, while the heavy liquid phase is shifted to a more distant part of the rotation axis, facilitating separation and removal of these liquids.

In addition, in alternative embodiments of these devices, there are means to remove solid particulates and/or gases from inside the envelope.

However, none of the known embodiments of centrifugal separators are able to operate under the high pressure that is typical of an oil processing plant. Thus, the liquid received by the devices, which is often already pressurized, must be depressurized before starting processing thereof.

Document WO2003061838A1, for example, shows a cleaning device to simultaneously clean liquid and gas, including a gas cleaning device, including a stack of conical disks which define a central separation space where the stack of separation disks is encompassed by stationary casing.

The cleaning device in WO2003061838A1, however, includes a specific compartment to remove particulates from a gas, and a second specific compartment to remove particulates from a liquid.

Document WO2000053330A1 shows a centrifugal separator to separate liquids where the liquid to be separated is placed into a central compartment, running into a separation chamber, comprising a stack of conical disks, so that rotation of the separator causes the heavy liquid to move towards the outer portion of the chamber and be discharged by a specific pipe, while the light liquid moves towards the central portion of the separator and is discharged by a second specific pipe.

However, the separator in WO2000053330A1 does not mention discharging gas inside the chamber, not even the fact that the liquid placed inside is pressurized.

Document WO1996022835A1 shows a centrifugal separator for separating particles from a liquid (oil), which includes a hollow cylindrical separation recipient. This recipient includes a number of disk-shaped cones which increase separation efficiency.

Document WO1996022835A1 also shows that the separator is powered by the high pressure of the jets of oil discharged from the separator, after separation of the particles.

However, document WO1996022835A1 does not cover separation of different density liquids, nor extraction of gases from such liquid.

Document CA2619883C shows a centrifugal separator, including a conical separator drum with a vertical axis of rotation. The separator includes an inlet tube for a product to be processed and at least two liquid outlets. The first liquid outlet is for a lighter phase and the second liquid outlet is for a heavier phase. The first liquid outlet includes an extraction disk. A solids discharge door is also included and a stack of separation plates.

Document CA2619883C, however, makes no reference to the use of a pressurized casing that allows liquid under pressure to be placed in the drum, nor does it make reference to the extraction of gases that might be in the liquid to a central pipe.

Thus, it is clear that the prior art lacks a centrifugal separator operating under pressure, and which preferably allows for separating an incoming flow, in a high density liquid phase, a low density liquid phase, solid particulates and gases.

SUMMARY OF THE INVENTION

The main objective of this invention is to provide a centrifugal separator which operates under pressure. In addition, the centrifugal separator should ideally allow for separation and incoming flow in a heavy liquid phase, a light liquid phase, solid particulates and gases.

Thus, to achieve this objective, this invention provides for a centrifugal separator including a group formed by: a central feed chamber, fed by a feed pipe; a separation chamber including a number of frustoconical disks; a first recovery chamber in communication with a first liquid phase recovery pipe and a gas phase recovery pipe; and a second recovery chamber in communication with a second liquid phase recovery pipe, where the group is encompassed by a rotating envelope, where the central feed chamber is in liquid fluid communication with the separation chamber and in fluid gaseous communication with the first recovery chamber in which the separation chamber is in fluid communication with the first and second recovery chambers, in which the centrifugal separator is encompassed by stationary pressurizable casing.

BRIEF DESCRIPTION OF THE FIGURE

The detailed description below makes reference to the attached FIGURE and its respective reference numbers, representing an optional embodiment of this invention.

The FIGURE illustrates an optional embodiment of the centrifugal separator of this invention.

DETAILED DESCRIPTION OF THE INVENTION

Preliminarily, note that the description below starts with the preferred embodiment of the invention, applied to a centrifugal separator. As will be apparent to anyone skilled in the art, however, the invention is not limited to this particular embodiment, so that some changes can be made to the described embodiment, whilst remaining within the protective scope of the invention.

The FIGURE illustrates an optional embodiment of the centrifugal separator of this invention, which includes a group comprising: a central feed chamber 10, fed by a feed pipe 20; a separation chamber 30 including a number of frustoconical disks 3; a first recovery chamber 11 in communication with a first liquid phase recovery pipe 21 and a gaseous phase recovery pipe 23; and a second recovery chamber 12 in communication with a second liquid phase recovery pipe 22.

According to the optional embodiment described, the group is encompassed by a rotating envelope 1, where the central feed chamber 10 is in fluid liquid communication with the separation chamber 30, and in gas fluid communication with the gas phase recovery pipe 23.

Additionally, separation chamber 30 is in fluid communication with the first 11 and second 12 recovery chambers.

In order to allow the process to be operated under pressure, the centrifugal separator is encompassed by a pressurizable stationary envelope 4a, 4b. In order to maintain the internal pressurization of the stationary casing 4a, 4b, and at the same time to allow communication of the liquid-phase recovery pipes 21,22 and gas recovery pipe 23, feed pipe 20 and rotation drive shaft 5, casing 4a, 4b includes at least one mechanical seal 6, 6a for communication of feed pipe 20, of gas-recovery pipe 23, of the first liquid-phase recovery pipe 21, of the second liquid phase recovery pipe 22, and the rotating drive shaft 5, to the outside.

As can be seen in the optional embodiment illustrated in the FIGURE, the pressurizable stationary casing 4a, 4b is comprised of two parts, a base 4b and an upper portion 4a, connected and sealed. These parts can be fastened with screws or with any other fastening. It is emphasized that this division is optional, and other embodiments can be made.

In addition, in the optional embodiment illustrated, the pipes to transport liquid (liquid phase recovery pipes 21,22 and gas phase recovery pipes 23 and feed pipe 20) are concentric pipes, so that only one seal is required for all 6. However, the rotation drive shaft 5 is positioned at a different point than pipes 20,21,22,23, so further mechanical sealing is required 6a. That is, this embodiment requires two seals 6, 6a.

However, other embodiments are provided for, in which both pipes 20,21,22,23 and rotation drive shaft 5 are concentric, so that only mechanical seal would be required 6,6a. In other embodiments, the pipes may not be concentric, so that individual seals would be required for each.

Therefore, operation of the centrifugal separator described herein, preferably is as follows, when the centrifugal separator is operating (rotating) the inflow is all directed to central feed chamber 10. This inflow generally involves at least two immiscible liquid phases of different densities (a lower density, called the light liquid phase and another higher density, called the heavy liquid phase), a gas phase and particulate solids. So all of these elements can, and usually are, initially mixed into a single flow.

When the inflow is fed into the feed chamber 10, the gas phase is directed to the first recovery chamber 11. In one embodiment of the invention, the feed chamber 10 and the first recovery chamber 11 are in direct communication, that is, they have no physical barrier. However, some sort of barrier can be used between them, noting that such barrier should not prevent the movement of gases between the chambers.

Due to the internal pressure of the centrifugal separator, gas is propelled to the first recovery chamber 11, with the gas phase recovery pipe 23, and it is subsequently stored and/or treated.

When the inflow feeds into the feed chamber 10, its liquid phase and contained solid particulates are directed to the separation chamber 30. This movement is due to gravity and the pressure of the inflow. Note that the separation chamber 30 is externally formed by the rotating envelope 1, which forms a sort of recipient.

In the separation chamber 30, the flow, now free of its gas phase, is rotated together with the whole group. Due to the positioning of the number of frustoconical disks 3 and the rotation speed, heavy and light liquid phases are separated. As is known by anyone skilled in the art, this step can be performed in different ways, but what will be described below, is only an example optionally adopted in accordance with the particular embodiment of the FIGURE.

When rotating the flow, due to centrifugal force, it tends to move to the outer region of the separation chamber 30. However, due to a combination of the positioning of the frustoconical disks 3 illustrated in the FIGURE and the rotation speed, the light liquid phase is redirected by the frustoconical disks 3 to the innermost region of the separation chamber 30, from where it moves to the first recovery chamber 11, where the first liquid phase recovery pipe 21 drains the light liquid phase to outside the separator, for storage and processing.

Also in this optional embodiment herein described, the heavy liquid phase, because it undergoes a greater influence from gravity, is moved by frustoconical disks 3 to the outermost part of the separation chamber 30, from where it is moved again to the second recovery chamber 12. As mentioned above, the second recovery chamber 12 comprises the second liquid phase recovery pipe 22 which, in this embodiment, is used to drain the flow of the heavy liquid phase.

As already mentioned, the inflow can also include solid particulates. These particulates are held back in the outer separation chamber 30. Optionally, the separation chamber 30 may include means to remove these particulates from the separation chamber 30.

Optionally, if one wants to provide a pressurization of the centrifugal separator greater than the pressurization provided by the incoming flow, the use of a pressurizer is also provided for. This element, not shown in the FIGURE, can be connected to the pressurizable casing.

The invention claimed is:

1. A centrifugal separator system comprised of:
   a centrifugal separator comprising:
      a central feed chamber fed by a feed pipe;
      a separation chamber comprising a number of frustoconical disks;
      a first recovery chamber in communication with a first liquid phase recovery pipe and a gaseous phase recovery pipe, the gaseous phase recovery pipe being configured to receive a gas phase from the first recovery chamber; and
      a second recovery chamber communicating with a second liquid phase recovery pipe,
   wherein the central feed chamber, the separation chamber, the first recovery chamber, the first liquid phase recovery pipe, the gaseous phase recovery pipe, and the second recovery chamber are encompassed by a rotating envelope, the central feed chamber is in liquid fluid communication with the separation chamber, and in gaseous fluid communication with the first recovery chamber, the separation chamber is in fluid communication with the first and second recovery chambers, the centrifugal separator system further comprises a pressurizable stationary envelope that encompasses the centrifugal separator, the pressurizable stationary envelope configured to be positively pressurized, and the feed pipe, the gaseous phase recovery pipe, the first liquid phase recovery pipe, and the second liquid phase recovery pipe are concentric.

2. The centrifugal separator system in accordance with claim 1, characterized by the pressurizable stationary envelope including at least one mechanical seal for communication of at least one of: the feed pipe; the gaseous phase recovery pipe; the first liquid phase recovery pipe; the second liquid phase recovery pipe; and a rotation drive shaft, with the outside.

3. The centrifugal separator system, in accordance with claim 1, wherein the central feed chamber is configured to:
move the gas phase to the first recovery chamber; and
move a liquid phase and solid particulates to the separation chamber.

4. The centrifugal separator system, in accordance with claim 1, characterized by the separation chamber configured to:
move a light liquid phase to the first recovery chamber; and
move a heavy liquid phase to the second recovery chamber.

5. The centrifugal separator system in accordance with claim 4, characterized by the first liquid phase recovery pipe being configured to drain the light liquid phase, and the second liquid phase recovery pipe being configured to drain the heavy liquid phase.

6. The centrifugal separator system in accordance with claim 1, characterized by the pressurizable stationary casing being a base and an upper portion, where the base and the upper portion are connected and sealed.

7. The centrifugal separator system in accordance with claim 3, characterized by the central feed chamber being configured to move the gas phase from the central feed chamber to the first recovery chamber, without the gas phase passing through the separation chamber.

8. A method of operating a centrifugal separator system comprising a centrifugal separator and a pressurizable stationary envelope that encompasses the centrifugal separator, the method comprising:
performing separation with the separator while the pressurizable stationary envelope is positively pressurized, wherein the centrifugal separator comprises:
a central feed chamber fed by a feed pipe;
a separation chamber comprising a number of frusto-conical disks;
a first recovery chamber in communication with a first liquid phase recovery pipe and a gaseous phase recovery pipe, the gaseous phase recovery pipe being configured to receive a gas phase from the first recovery chamber; and
a second recovery chamber communicating with a second liquid phase recovery pipe,
wherein the central feed chamber, the separation chamber, the first recovery chamber, the first liquid phase recovery pipe, the gaseous phase recovery pipe, and the second recovery chamber are encompassed by a rotating envelope,
the central feed chamber is in liquid fluid communication with the separation chamber, and in gaseous fluid communication with the first recovery chamber,
the separation chamber is in fluid communication with the first and second recovery chambers, and
the feed pipe, the gaseous phase recovery pipe, the first liquid phase recovery pipe, and the second liquid phase recovery pipe are concentric.

9. The method in accordance with claim 8, characterized by the pressurizable stationary envelope including at least one mechanical seal for communication of at least one of: the feed pipe; the gaseous phase recovery pipe; the first liquid phase recovery pipe; the second liquid phase recovery pipe; and a rotation drive shaft, with the outside.

10. The method in accordance with claim 8, wherein the performing the separation comprises:
moving the gas phase to the first recovery chamber, via the central feed chamber; and
moving a liquid phase and solid particulates to the separation chamber, via the central feed chamber.

11. The method in accordance with claim 8, wherein the performing the separation comprises:
moving a light liquid phase to the first recovery chamber, via the separation chamber; and
moving a heavy liquid phase to the second recovery chamber, via the separation chamber.

12. The method in accordance with claim 11, wherein the performing the separation further comprises:
draining the light liquid phase via the first liquid phase recovery pipe, and
draining the heavy liquid phase via the second liquid phase recovery pipe.

13. The method in accordance with claim 8, wherein the pressurizable stationary casing is a base and an upper portion, where the base and the upper portion are connected and sealed.

14. The method in accordance with claim 11, wherein the moving the gas phase to the first recovery chamber comprises moving the gas phase from the central feed chamber to the first recovery chamber, without the gas phase passing through the separation chamber.

* * * * *